US011364555B2

(12) United States Patent
Arai et al.

(10) Patent No.: US 11,364,555 B2
(45) Date of Patent: Jun. 21, 2022

(54) DRILL

(71) Applicant: Bic Tool Co., Ltd, Tottori (JP)

(72) Inventors: Koichi Arai, Tottori (JP); Giichi Arai, Tottori (JP); Katsuyo Kimura, Tottori (JP); Satoshi Teshima, Tottori (JP)

(73) Assignee: Bic Tool Co., Ltd, Tottori (JP)

( * ) Notice: Subject to any disclaimer, the term of this patent is extended or adjusted under 35 U.S.C. 154(b) by 0 days.

(21) Appl. No.: 16/369,223

(22) Filed: Mar. 29, 2019

(65) Prior Publication Data

US 2019/0308254 A1 Oct. 10, 2019

(51) Int. Cl.
*B23B 51/02* (2006.01)

(52) U.S. Cl.
CPC .......... *B23B 51/02* (2013.01); *B23B 2251/04* (2013.01); *B23B 2251/085* (2013.01); *B23B 2251/14* (2013.01); *B23B 2251/18* (2013.01)

(58) Field of Classification Search
CPC .......... B23B 2251/08; B23B 2251/082; B23B 2251/44; B23B 2251/443; B23B 2251/085; B23B 2251/087; B23B 2251/14; B23B 2251/18; B23B 51/02; B23B 2226/275; B23B 2215/04
See application file for complete search history.

(56) References Cited

U.S. PATENT DOCUMENTS 3,667,857 A * 6/1972 Shaner et al. .......... B23B 51/08 408/230
5,636,948 A * 6/1997 Rexius .................... B23B 51/02 407/54
10,646,934 B2 * 5/2020 Tsutsumi ................ B23B 51/02
2011/0158757 A1 * 6/2011 Schwagerl ............. B23B 51/02 408/230
2012/0183367 A1 * 7/2012 Kress ...................... B23B 51/02 408/145
2019/0351490 A1 * 11/2019 Brohede ................ B23B 51/02

FOREIGN PATENT DOCUMENTS

DE 3325149 A1 * 1/1985 ............ B23B 51/02
JP 2005305610 A * 11/2005
JP 2006-088267 A 4/2006

(Continued)

OTHER PUBLICATIONS

Machine Translation, DE3325149A1, Guehring, G., Jan. 24, 1985. (Year: 1985).*

(Continued)

*Primary Examiner* — Chwen-Wei Su
(74) *Attorney, Agent, or Firm* — Kelly & Kelley, LLP

(57) ABSTRACT

Provided herein is a drill having less possibility of cracks in an inner periphery of a drilled workpiece and deformation of a workpiece upon penetrating with a drill, as well as delamination.

A drill according to the present invention comprises two cutting blades which are formed symmetrical about an axis of rotation, wherein each of the cutting blades has a main cutting blade formed from a drill tip toward a peripheral side of the drill to become a shape with curves, a thinning cutting blade in a shape with curves formed in closer to the drill tip than the main cutting blade, and an U-shaped cutting blade in a shape with curves formed in closer to the periphery of the drill than the thinning cutting blade.

3 Claims, 17 Drawing Sheets

(56) References Cited

FOREIGN PATENT DOCUMENTS

| | | | | | |
|---|---|---|---|---|---|
| JP | 2009255209 A | * | 11/2009 | | |
| JP | 2012-192514 A | | 10/2012 | | |
| WO | WO-2019201962 A1 | * | 10/2019 | ............. | B23B 51/06 |

OTHER PUBLICATIONS

Machine Translation, JP 2005-305610 A, Suzuki, K. et al., Nov. 2005. (Year: 2005).*
Naohiko Sugita et al. “Novel drill bit with characteristic web shape for high efficiency and accuracy” CIRP Annals—Manufacturing Technology 67 (2018) 69-72.
Naohiko Sugita et al. “Dedicated drill design for reduction in burr and delamination during the drilling of composite materials” CIRP Annals—Manufacturing Technology 68 (2019) 89-92.

* cited by examiner

PRIOR ART

DRILL

TECHNICAL FIELD

The present invention relates to a drill, in particular, a drill preferably used for drilling holes by manpower using a hand drill, a drill press or the like.

BACKGROUND OF THE INVENTION

Recently, for drills for machine tools such as machining centers or the like, fully automatic machines allowing unmanned processing are becoming the mainstream and thus various kinds of drills corresponding to the fully automatic machines have been developed and sold.

However, drills used for devices requiring operator's power to drill holes, such as a hand drill or a drill press, have not been positively researched or developed. As a result, drills in almost same configurations have been used over several decades.

Since drills used for a hand drill, a drill press or the like employ operator's arm strength to drill holes, it is difficult to drill holes when drilling resistance is high.

However, manufacturers of drills have spent little time on research for decreasing the high drilling resistance. It is partly because they have prioritized strength and stiffness of the conventional drills, and because users of drills actually grind a drill in accordance with one's taste after purchasing it.

In Japanese Unexamined Patent Application Publication No. 2006-88267, the applicant proposes a drill preferably used for exfoliating a spot welding part of a car's body which is made of high hardness steel sheets.

This drill has two cutting blades which are symmetrical about an axis of rotation, has a tip part on which thinning is performed, and has 0.05 to 0.3 mm chisel width, and its thinning is performed at an inclined angle of 1 to 4 degrees toward the straight line joining blade edges of both cutting blades when seen from the drill's tip side.

This drill has less thrust resistance during drilling and requires less power applied by an operator, since its chisel width is narrow and thinning is performed at 1 to 4 degrees.

However, this drill has a rake angle of more than 90 degrees shaped by thinning in order to deal with steel sheets with high hardness.

Therefore, the drilling force of the central part is weak, and when drilling with a hand drill, a significant power would be required till the drilling from a central part reaches to a peripheral cutting blade.

Moreover, a tip has a risk of breakage during use because of a quite narrow width of a chisel, and particularly a tip of a drill made from powder high-speed steel is fragile and more easily chipped.

In Japanese Unexamined Patent Application Publication No. 2012-192514, the applicant proposes a drill capable of significantly reducing drilling resistance and allowing easy hole-drilling by manpower using a hand drill, a drill press or the like.

The drill has two cutting blades which are symmetrical about an axis of rotation, wherein thinning is performed on its tip part, and a rake angle $\theta_1$ formed by a main cutting blade and a rake angle $\theta_2$ formed by a thinning cutting blade satisfy $\theta_1>\theta_2>0°$, except for a part just below the chisel.

SUMMARY OF THE INVENTION

For a drill (101) described in Japanese Unexamined Patent Application Publication No. 2012-192514, a rake angle changes when drilling started by a thinning cutting blade (103) reaches a main cutting blade (104): the gentle rake angle allowing a stable drilling rapidly increases at an inner edge part (105) of the main cutting blade (104), further increases as a drilled part approaches the drill's peripheral side, and becomes equal to a flight angle at a peripheral part (106) (see FIG. 17).

As a result, there are frequent problems upon penetrating with a drill such as cracks in an inner periphery of a drilled workpiece and deformation of a workpiece when it is a thin plate, acryl or the like.

When a workpiece is a laminated material, for example, a carbon fiber reinforced plastic (hereinafter referred to as CFRP), there are problems of inducing an interlayer peeling phenomenon (delamination) when drilling holes, or delamination when drilling CFRP by the conventional drill in FIG. 17.

Common drills having a flight angle of about 30 degrees (=rake angle/peripheral part) may cause the problems.

Though the problems can be solved by making a gentle flight angle of a drill, other problems such as discharged chips are brought and may deteriorate sharpness of a drill itself. Hence, it is impossible to solve the problems only by making a gentle flight angle.

As a result of zealous examination, the inventors found out that the problems can be solved by providing a main cutting blade of a drill with U-shaped grooves.

The present invention is made to solve the problems of the Prior-Arts, and provides a drill having less possibility of cracks in an inner periphery of a drilled workpiece and its deformation upon penetrating with a drill, as well as delamination.

The present invention according to first aspect relates to a drill comprising two cutting blades which are formed symmetrical about an axis of rotation, wherein each of the cutting blades has a main cutting blade formed from a drill tip toward a peripheral side of the drill to become a shape with curves, a thinning cutting blade formed in closer to the drill tip than the main cutting blade to become a shape with curves, and an U-shaped cutting blade formed on the drill's peripheral part of the thinning cutting blade to become a shape with curves.

The present invention according to second aspect relates to the drill of first aspect, wherein the U-shaped cutting blade is formed near the peripheral part of the drill.

The present invention according to third aspect relates to the drill of first aspect, wherein the U-shaped cutting blade is formed to be adjacent to the thinning cutting blade and aligned at the outer peripheral side in a radial direction.

The present invention according to fourth aspect relates to the drill of any one of first to third aspects, having two clearance faces formed symmetrical to an axis of rotation, wherein the clearance faces are provided with back grooves in a shape with curves so as to comprise a first margin part and a second margin part located at a heel side of the first margin part.

The present invention according to fifth aspect relates to the drill of fourth aspect, wherein a second margin cutting blade is provided at the second margin part.

The invention according to sixth aspect relates to the drill of fourth or fifth aspect, wherein multiple peripheral grooves are formed at a peripheral part of the main cutting blade and/or a peripheral part of the second margin cutting blade.

According to the invention of first aspect, there is provided a drill comprising a thinning cutting blade in a shape with curves formed in closer to the drill tip than the main cutting blade, and an U-shaped cutting blade in a shape with curves formed in closer to the periphery of the drill than the thinning cutting blade, such that drilling resistance can be significantly decreased and make it easier to drill holes using a hand drill, a manual drill press or the like, even if drilling a thin plate, soft materials, or a carbon fiber reinforced plastic (CFRP). Moreover, the reduction of drilling resistance improves drilling accuracy and reduces the time to drill holes, resulting in an improvement of working efficiency. It also allows for a significant increase in the drill's life span.

Therefore, provided herein is a drill having less possibility of cracks in an inner periphery of a drilled workpiece and deformation of a workpiece upon penetrating with a drill, as well as delamination.

According to the invention of second aspect, an U-shaped cutting blade is formed near the peripheral part of the drill, thereby enhancing a cutting force and reducing drilling resistance. In addition, it is possible to discourage the drill's wear and significantly increase the drill's life span.

According to the invention of third aspect, an U-shaped cutting blade is formed to be adjacent to the thinning cutting blade and aligned at the outer peripheral side in a radial direction, thereby enhancing a cutting force and reducing drilling resistance. In addition, it is possible to discourage the drill's wear and significantly increase the drill's life span.

According to the invention of fourth aspect, there are provided two clearance faces formed symmetrical to an axis of rotation, wherein the clearance faces are provided with back grooves in a shape with curves so as to comprise a first margin part and a second margin part located at a heel side of the first margin part, thereby more easily preventing cracks in an inner periphery of a drilled workpiece and deformation of a thin plate upon penetrating with a drill, and delamination.

According to the invention of fifth aspect, a second margin cutting blade is provided on the second margin part, thereby enabling to cut away a part which is difficult to cut due to a little elastic deformation during drilling, and more easily prevent delamination.

According to the invention of sixth aspect, there are formed multiple peripheral grooves at a peripheral part of the main cutting blade and/or a peripheral part of the second margin cutting blade, thereby enabling to suppress heat generation during drilling a workpiece, and solve problems such as deformation of drilled holes and a change of material quality of a workpiece due to heat generation during drilling.

DETAILED DESCRIPTION OF THE INVENTION

Preferred embodiments of a drill according to the present invention are set forth with reference to the accompanying drawings.

First Embodiment

Figure 1:
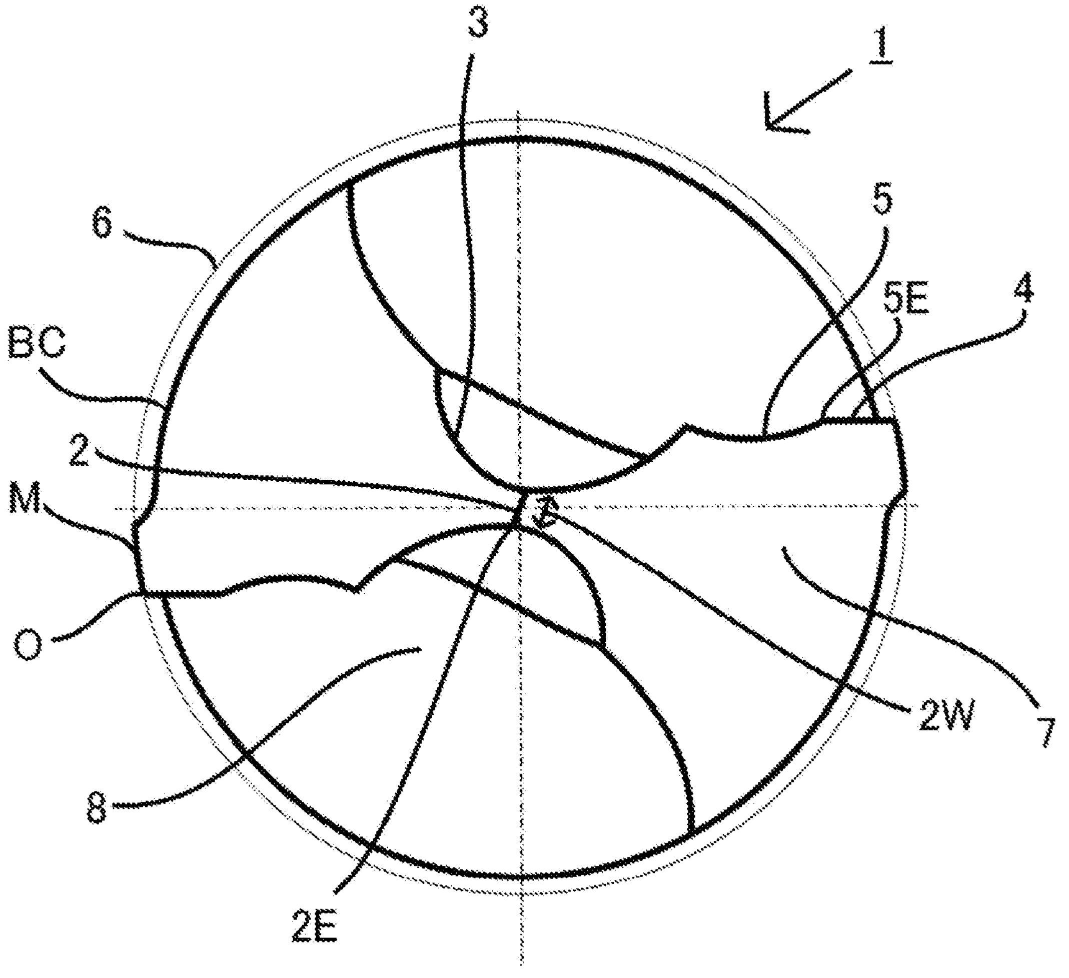
FIG. 1 It is a top view (seen from a tip side of a drill) of a drill according to first embodiment.
Figure 2:
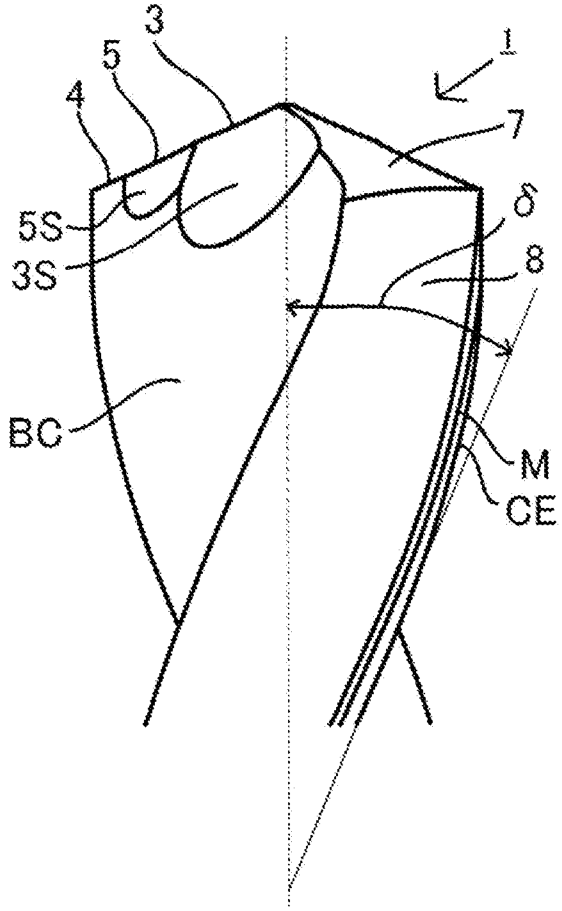
FIG. 2 It is a front view (side view) of a drill according to the first embodiment.

FIG. 1 is a top view (seen from a tip side of a drill) and FIG. 2 is a front view (side view) of a drill according to the first embodiment.

A drill (1) according to the first embodiment has almost a cylindrical shape with a diameter ϕ having a central axis in a vertical direction.

The material of the drill (1) includes, for example, JIS•SKH40 (high speed steel powder), hard metals or the like. The hardness of the drill (1) is preferably HRC66 to 68 in case of JIS•SKH40, and preferably HRA90 in case of hard metals.

The upper half of the drill (1) has two cutting blades which are formed symmetrical about an axis of rotation, and approximately U-shaped thinning is performed on their tips.

"Thinning" means polishing to form a cutting blade at a core thickness part of a drill.

It is possible to form a cutting blade with negative rake angle by thinning to reduce only the core thickness of the chisel.

It is preferable that a margin part (M) is formed on the upper half of the drill (1), which serves as a guide preventing a drilled hole from being formed in bent.

The margin part (M) is formed so that back grooves (BC) are formed in a shape with curves.

The lower half of the drill (1) is formed so that it can be attached to or detached from a hand drill, a drill press or the like.

Each cutting blades consist of a thinning cutting blade (3) extending from a chisel edge (2E) of a chisel (2) formed at the center part of the drill toward a peripheral side of the drill to become a shape with curves, a main cutting blade (4) extending from an end part (3E) of the thinning cutting blade (3) toward a peripheral part (O) of the drill, and an U-shaped cutting blade (5) formed in closer to the outer periphery of the drill than the thinning cutting blade (3) to become a shape with curves, when seen from the tip side of the drill.

In the illustrated example, the main cutting blade (4) extends in a linear fashion from an end part (5E) of the U-shaped cutting blade (5) to the peripheral part (O) of the drill (i.e. drill diameter (6)), but it may extend in a curved fashion, or in a fashion including linear and curved parts. This is common in all the embodiments of the present invention.

Further, the main cutting blade (4) is formed to have a rake angle $\theta_1$ in a vertical direction. The numeral (7) in FIGS. 1 and 2 refers to a clearance face.

It is preferable to set a chisel width (2W) of the chisel (2) smaller so that the blade can easily cut a workpiece even if the drill is pressed against the workpiece by manpower using a hand drill or the like.

Specifically, it is preferable to set the chisel width 10% or less of a diameter $\phi$ of the drill.

For example, if the drill diameter $\phi$ is 2-13 mm, the chisel width (2W) is appropriately set to a range of 0.1-1.3 mm depending on increase or decrease of the drill diameter.

For the drill (1) according to the first embodiment, it is preferable to set the flight angle $\delta$ of the main cutting blade (4) in a vertical direction in a range of 10 to 30 degrees, more preferably 18 degrees.

Because of a difficulty in discharging chips and decrease in sharpness of the drill, it is not preferable to set the flight angle $\delta$ less than 10 degrees or more than 30 degrees.

When the flight angle is set to 10 to 30 degrees, it enables easy discharge of chips and improved sharpness of the drill.

Therefore, the flight angle $\delta$ is preferably set to approximately 18 degrees.

It is preferable to provide the thinning cutting blade (3) inclined along a twisting direction of a chip discharge port (8).

A thinning face (3S) provided at the tip part of the drill is almost U-shaped, has a tilt angle of $3\gamma$ in a vertical direction and satisfies $\delta \leq 3\gamma$. The tilt angle of $3\gamma$ of the thinning face (3S) is preferably set to a range from 15 to 40 degrees (for example, 25 degrees).

In addition, the thinning cutting blade (3) is configured to have a rake angle $\theta_2$ in a vertical direction.

The U-shaped cutting blade (5) as well as the thinning cutting blade (3) is preferably provided to incline along the twisting direction of the chip discharge port (8).

For the drill (1) according to the first embodiment, the U-shaped cutting blade (5) is provided in contact with the thinning cutting blade (3).

A face of the U-shaped cutting blade (5S) provided at the tip part is almost U-shaped, has a tilt angle of $5\gamma$ in a vertical direction, and satisfies $\delta \leq 5\gamma$. The tilt angle of $5\gamma$ of the face of the U-shaped cutting blade (5S) is preferably set to a range from 15 to 40 degrees (for example, 25 degrees).

In addition, the U-shaped cutting blade (5) is configured to have a rake angle $\theta_2$ in a vertical direction.

Due to the U-shaped cutting blade (5) provided in contact with the thinning cutting blade (3), it is possible to prevent the rapid increase in the rake angle.

For the drill (1) according to the first embodiment, it is preferable to set the rake angle $\theta_2$ of the thinning cutting blade (3) to $\leq 0°$ and smaller than the rake angle $\theta_1$ of the main cutting blade (4), and set the rake angle $\theta_3$ of the U-shaped cutting blade (5) to be equal to or a little larger than the rake angle $\theta_2$ of the thinning cutting blade (3).

It means the relationship between these rake angles is $\theta_1 > \theta_3 \geq \theta_2 > 0°$. It is noted that $\theta_2 \cong 0°$ ($\theta_2 < 0°$, approximately equal to 0°) is only satisfied just below the chisel (2).

Preferably, a blade edge angle $\alpha_1$ formed by the main cutting blade (4) and a blade edge angle $\alpha_2$ formed by the thinning cutting blade (3) satisfy $\alpha_1 \leq \alpha_2 < 90°$.

The rake angle $\theta_1$ of the main cutting blade (4) is approximately equal to the flight angle $\delta$ because the main cutting blade (4) remains on the outer periphery of the drill, and the drill (1) according to the first embodiment provides good results when a workpiece is relatively thick, for example, metals etc.

The clearance face (7) preferably has a clearance angle $\beta$ relative to the horizontal surface and the clearance angle $\beta$ is preferably set to satisfy $0° < \beta < 10°$. More preferably, it is set to satisfy $0° < \beta \leq 6°$.

Hence, the drill (1) according to the first embodiment comprising the thinning cutting blade (3), the main cutting blade (4), and the U-shaped cutting blade (5) can significantly reduce drilling resistance, and can easily drill holes by manpower using a hand drill, a manual drill press or the like when drilling not only steel-based materials such as stainless but also a thin plate, soft materials, and a carbon fiber reinforced plastic (CFRP).

Moreover, the reduction of drilling resistance improves drilling accuracy and reduces the time to drill holes, resulting in improvement of working efficiency. It also enables a significant increase in the drill's life span.

Second Embodiment

Figure 3:
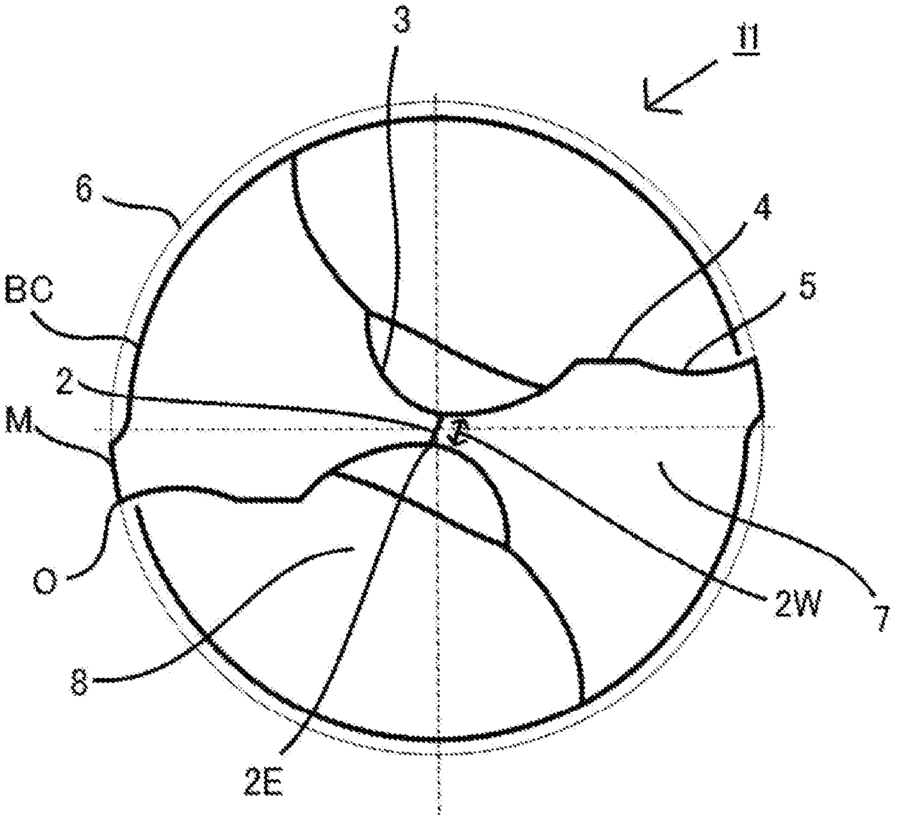
FIG. 3 It is a top view (seen from a tip side of a drill) of a drill according to second embodiment.
Figure 4:
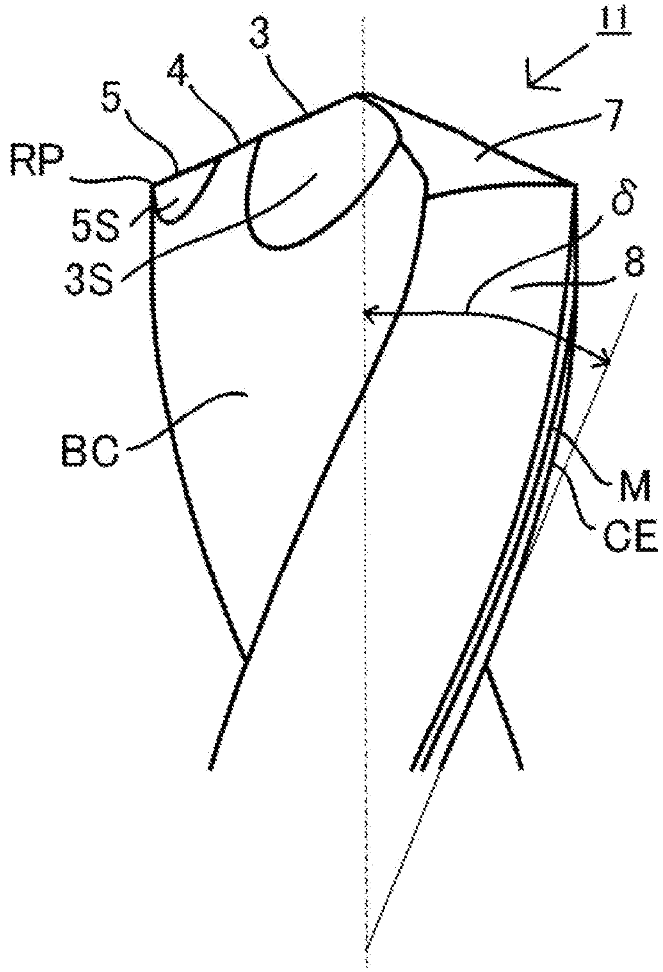
FIG. 4 It is a front view (side view) of a drill according to the second embodiment.

FIG. 3 is a top view (seen from a tip side of a drill) and FIG. 4 is a front view (side view) of a drill according to the second embodiment.

In FIGS. 3 and 4, same components as shown in the drill of FIGS. 1 and 2 are given the same numerals. The U-shaped cutting blade (5) is separated from the thinning cutting blade (3) such that the main blade (4) is located between the thinning cutting blade (3) and the U-shaped cutting blade (5).

For a drill (11) according to the second embodiment, an U-shaped cutting blade (5) is provided near a peripheral part (O) of the drill (i.e. in contact with the peripheral part (O)).

The U-shaped cutting blade (5) is connected to a peripheral cutting blade (CE) which is sharpened with the provided U-shaped cutting blade (5), and the rake angle is gentle except for a remaining part (RP) from the U-shaped cutting blade (5).

Since the U-shaped cutting blade (5) is provided in contact with the peripheral part (O) of the drill, it is possible to prevent a rapid increase in the rake angle as a drilled part of a workpiece approaches the drill's periphery during drilling.

For the drill (11) according to the second embodiment, it is preferable to set the rake angle $\theta_2$ of the thinning cutting blade (3) to $\leq 0°$ and smaller than the rake angle $\theta_1$ of the main cutting blade (4), and set the rake angle $\theta_3$ of the U-shaped cutting blade (5) to be equal to or a little larger than the rake angle $\theta_2$ of the thinning cutting blade (3).

It means the relationship between these rake angles is $\theta_1 > \theta_3 \geq \theta_2 > 0°$.

For the drill (11) according to the second embodiment, the peripheral cutting blade (CE) is sharpened in a rotational direction. The rake angle $\theta_3$ of the U-shaped cutting blade (5) is gentle, and equal to the flight angle $\delta$ when it reaches the peripheral cutting blade (CE).

The drill (11) according to the second embodiment can provide preferable results due to the above-mentioned configuration, especially when processing CFRP.

More specifically, the above-mentioned configuration provides a function of removing carbon fibers at the peripheral part (O) of the drill, and makes the rake angle gentle except at the peripheral part (O) of the drill. As a result, the cutting force of the drill (11) is significantly improved, thereby solving problems such as fluffing of carbon fibers around a drilled hole of a workpiece, and delamination when drilling a workpiece such as CFRP, etc.

The drill (11) according to the second embodiment has the same configuration as that of the drill (1) according to the first embodiment except for the above-mentioned components and the tilt angle 5γ of a face of the U-shaped cutting blade (5S).

The tilt angle 5γ is set to δ>5γ so as not to interfere with the peripheral cutting blade.

As mentioned above, the drill (11) according to the second embodiment comprising the thinning cutting blade (3), the main cutting blade (4), and the U-shaped cutting blade (5) can significantly reduce drilling resistance, and can easily drill holes by manpower using a hand drill, a manual drill press or the like when drilling not only steel-based materials such as stainless but also a thin plate, soft materials, and a carbon fiber reinforced plastic (CFRP).

Moreover, the reduction of drilling resistance improves drilling accuracy and reduces the time to drill holes, resulting in an improvement of working efficiency. It also allows for significant increase in the drill's life span.

Third Embodiment

Figure 5:
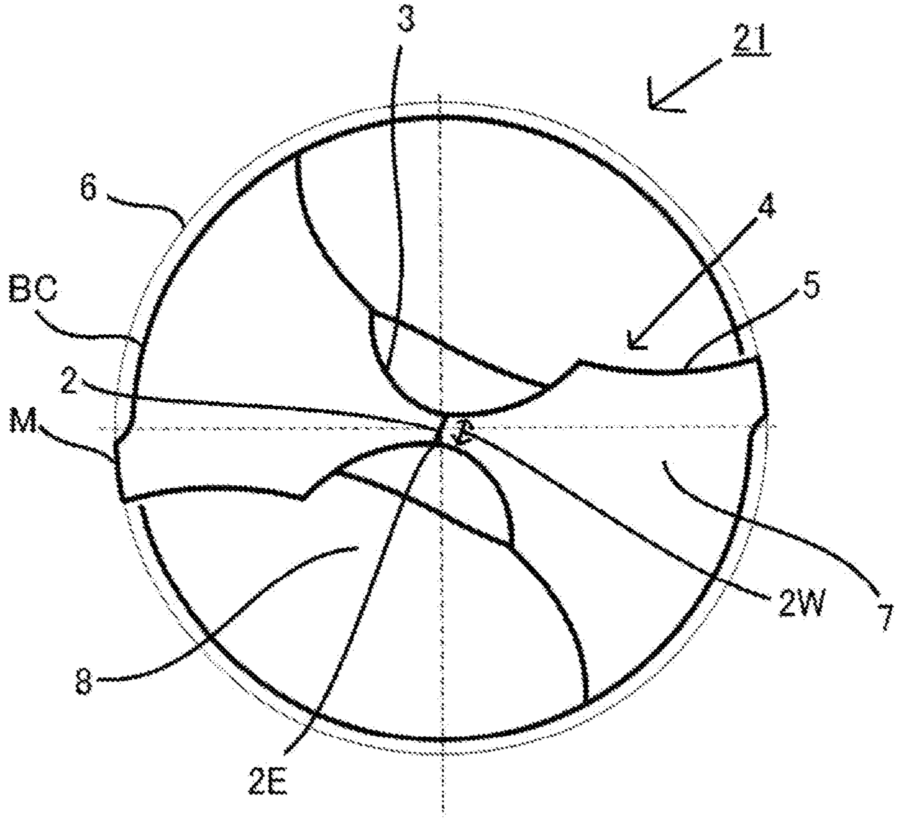
FIG. 5 It is a top view (seen from a tip side of a drill) of a drill according to third embodiment.
Figure 6:
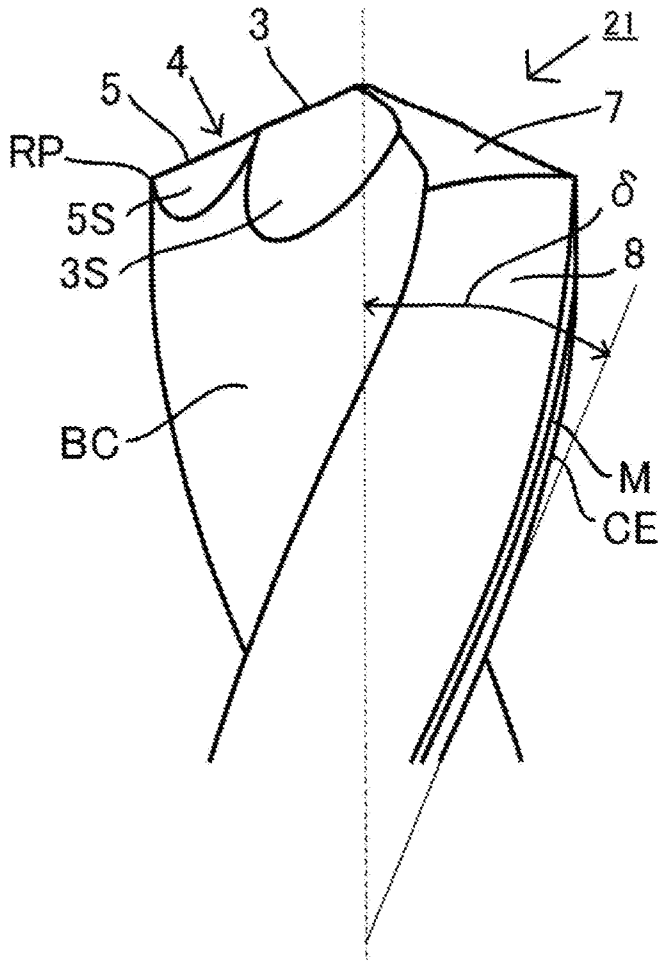
FIG. 6 It is a front view (side view) of a drill according to the third embodiment.

FIG. 5 is a top view (seen from a tip side of a drill) and FIG. 6 is a front view (side view) of a drill according to the third embodiment.

In FIGS. 5 and 6, same components as shown in the drill of FIGS. 1 and 2 are given the same numerals.

For a drill (21) according to the third embodiment, an U-shaped cutting blade (5) is formed to be adjacent to a thinning cutting blade (3) and aligned at the outer peripheral side in a radial direction. It means the U-shaped cutting blade (5) is provided throughout a main cutting blade (4).

The U-shaped cutting blade (5) is in contact with a peripheral cutting blade (CE) and the thinning cutting blade (3), and the peripheral cutting blade (CE) is sharp while the rake angle $\theta_3$ of the U-shaped cutting blade (5) which replaces the main cutting blade (4) is gentle.

Due to the U-shaped cutting blade (5) provided throughout the main cutting blade (4), it is possible to prevent rapid increase in the rake angle.

For the drill (21) according to the third embodiment, it is preferable to set the rake angle $\theta_2$ of the thinning cutting blade (3) to ≤0° and smaller than the rake angle $\theta_1$ of the main cutting blade (4), and set the rake angle $\theta_3$ of the U-shaped cutting blade (5) to be equal to or a little larger than the rake angle $\theta_2$ of the thinning cutting blade (3).

It means the relationship between these rake angles is $\theta_1>\theta_3\geq\theta_2>0°$.

For the drill (21) according to the third embodiment, a rake angle of a part in which a rake is formed from the peripheral cutting blade (CE) to the groove part (remaining part (RP) from the U-shaped cutting blade (5)) is almost equal to a flight angle δ.

The drill (21) according to the third embodiment can provide more preferable results thanks to the above-mentioned configuration especially when processing CFRP.

More specifically, the above-mentioned configuration provides a function of removing carbon fibers at a peripheral part (O) of the drill, and makes the rake angle gentle except at the peripheral part (O) of the drill. As a result, the cutting force of the drill (11) is significantly improved, thereby solving problems such as fluffing of carbon fibers around a drilled hole of a workpiece, and delamination when drilling a workpiece such as CFRP, etc.

The drill (21) according to the third embodiment has the same configuration as that of the drill (1) according to the first embodiment except for the above-mentioned components.

Hence, the drill (21) according to the third embodiment comprising the thinning cutting blade (3) and the U-shaped cutting blade (5) provided throughout the main cutting blade (4) can significantly reduce drilling resistance, and can easily drill holes by manpower using a hand drill, a manual drill press or the like when drilling not only steel-based materials such as stainless but also a thin plate, soft materials, and a carbon fiber reinforced plastic (CFRP).

Moreover, the reduction of drilling resistance improves drilling accuracy and reduces the time to drill holes, resulting in an improvement of working efficiency. It also allows for significant increase in the drill's life span.

Fourth Embodiment

Figure 7:
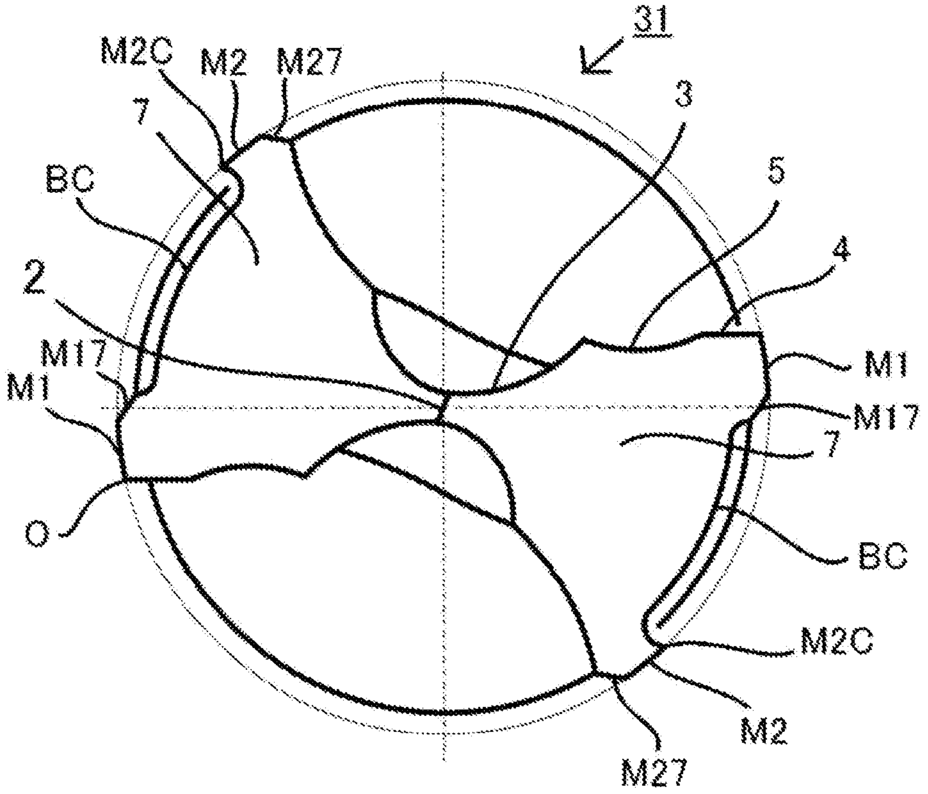
FIG. 7 It is a top view (seen from a tip side of a drill) of a drill according to forth embodiment.
Figure 8:
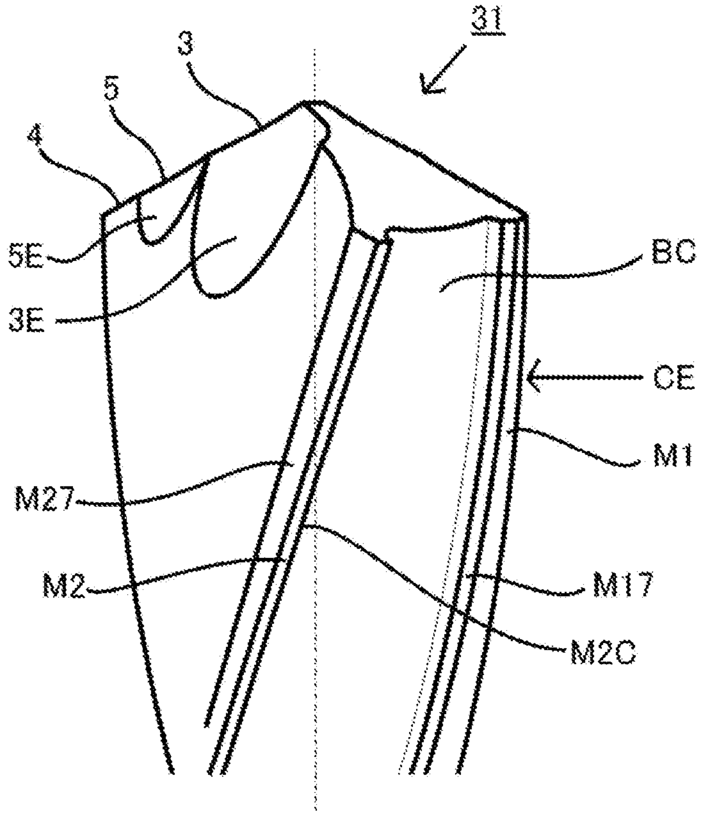
FIG. 8 It is a front view (side view) of a drill according to the forth embodiment.

FIG. 7 is a top view (seen from a tip side of a drill) and FIG. 8 is a front view (side view) of a drill according to the forth embodiment.

In FIGS. 7 and 8, same components as shown in the drill of FIGS. 1 and 2 are given the same numerals.

For a drill (31) according to the forth embodiment as well as the first embodiment, an U-shaped cutting blade (5) is provided in contact with a thinning cutting blade (3).

The drill (31) is provided with two clearance faces (7) symmetrical about an axis of rotation, each of which has back grooves (BC) in a shape with curves.

Hence, a peripheral part (O) of the drill is a double margin type (i.e. there are a first margin part (M1) and a second margin part (M2)) substantially having four blades, i.e. a cutting blade (second margin cutting blade (M2C)) is also provided for the second margin part (M2) at the heel side, thereby more easily preventing delamination during drilling a workpiece such as CFRP.

As shown in FIGS. 7 and 8, the first margin part (M1) and the second margin part (M2) preferably have a first margin clearance part (M1) and a second margin clearance part (M2) respectively so as to avoid unnecessary friction with a workpiece.

The drill (31) according to the forth embodiment has the same configuration as that of the drill (1) according to the first embodiment except for the above-mentioned components.

Hence, the drill (31) according to the forth embodiment comprising the thinning cutting blade (3), the main cutting blade (4), and the U-shaped cutting blade (5) can significantly reduce drilling resistance, and can easily drill holes by manpower using a hand drill, a manual drill press or the like when drilling not only steel-based materials such as stainless but also a thin plate, soft materials, and a carbon fiber reinforced plastic (CFRP).

Moreover, the reduction of drilling resistance improves drilling accuracy and reduces the time to drill holes, resulting in an improvement of working efficiency. It also allows for significant increase in the drill's life span.

Fifth Embodiment

Figure 9:
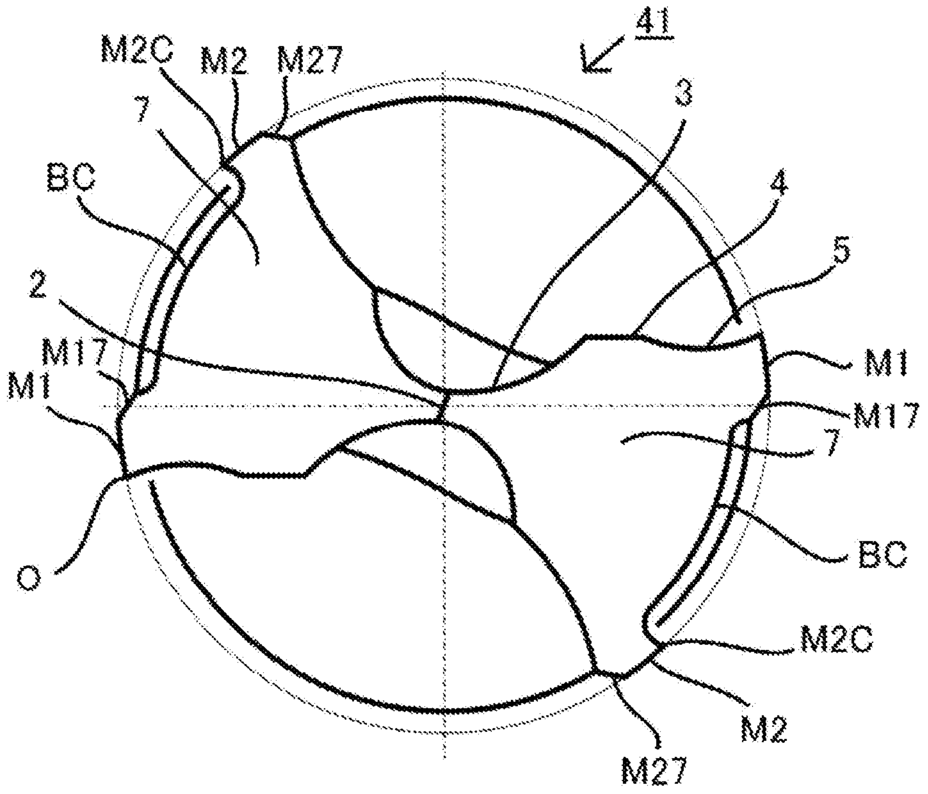
FIG. 9 It is a top view (seen from a tip side of a drill) of a drill according to fifth embodiment.
Figure 10:
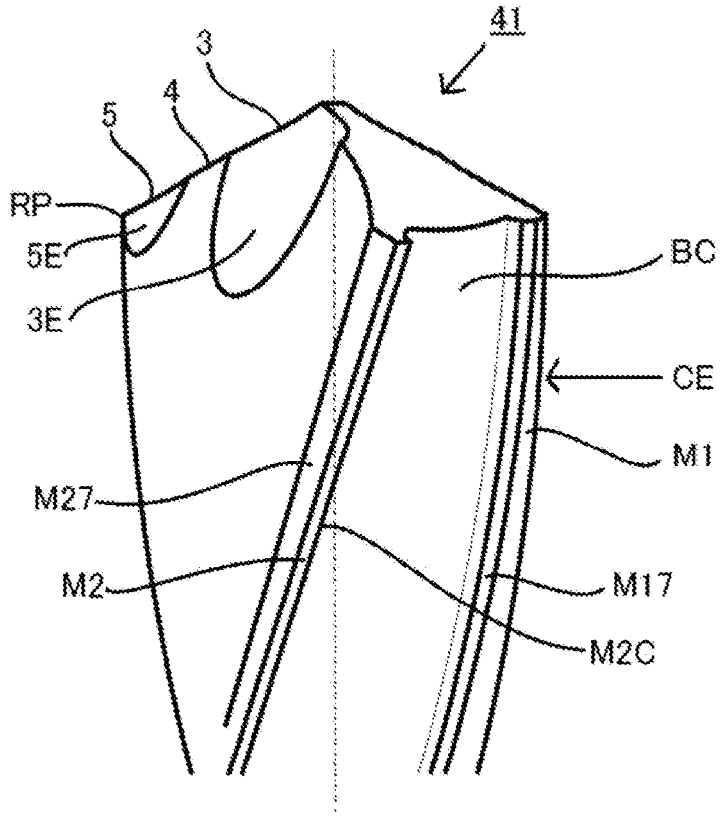
FIG. 10 It is a front view (side view) of a drill according to the fifth embodiment.

FIG. 9 is a top view (seen from a tip side of a drill) and FIG. 10 is a front view (side view) of a drill according to the fifth embodiment.

In FIGS. 9 and 10, same components as shown in the drill of FIGS. 7 and 8 are given the same numerals.

For a drill (41) according to the fifth embodiment as well as the second embodiment, an U-shaped cutting blade (5) is provided in contact with a peripheral part (O) of the drill.

The U-shaped cutting blade (5) is connected to a peripheral cutting blade (CE) which is sharpened due to the provided U-shaped cutting blade (5), and a rake angle is gentle except for a remaining part (RP) from the U-shaped cutting blade (5).

Since the U-shaped cutting blade (5) is provided in contact with the peripheral part (O) of the drill, it is possible to prevent an increase in the rake angle which rapidly increases as a drilled part of a workpiece approaches the drill's periphery during drilling. For the drill (41) according to the fifth embodiment, the peripheral part of the drill is a double margin type (i.e. there are a first margin part (M1) and a second margin part (M2)) substantially having four blades, i.e. a cutting blade (second margin cutting blade (M2C)) is also provided for the second margin part (M2) at the heel side, thereby more easily preventing delamination during drilling a workpiece such as CFRP.

As shown in FIGS. 9-10, the first margin part (M1) and the second margin part (M2) preferably have a first margin clearance part (M1) and a second margin clearance part (M2) respectively so as to avoid unnecessary friction with a workpiece.

For the drill (41) according to the fifth embodiment, it is preferable to set the rake angle $\theta_2$ of the thinning cutting blade (3) to ≤0° and smaller than the rake angle $\theta_1$ of the main cutting blade (4), and set the rake angle $\theta_3$ of the U-shaped cutting blade (5) to be equal to or a little larger than the rake angle $\theta_2$ of the thinning cutting blade (3).

It means the relationship between these rake angles is $\theta_1 > \theta_3 \geq \theta_2 > 0°$.

For the drill (41) according to the fifth embodiment, a part drilled by the peripheral cutting blade (CE) is subsequently drilled by the second margin cutting blade (M2C), thereby enabling to cut away a part which is difficult to cut due to a little elastic deformation during drilling, and solve problems such as delamination when drilling a workpiece such as CFRP, etc.

The drill (41) according to the fifth embodiment has the same configuration as that of the drill (11) according to the second embodiment except for the above-mentioned components.

The tilt angle 5γ of a face of the U-shaped cutting blade (5S) is set to δ>5γ so as not to interfere with the peripheral cutting blade.

For the drill (41) according to the fifth embodiment, though the peripheral cutting blade (CE) is sharpened in a rotational direction, the rake angle $\theta_3$ of the U-shaped cutting blade (5) is gentle and equal to the flight angle δ at the peripheral cutting blade (CE).

The drill (41) according to the fifth embodiment can provide more preferable results, especially when processing CFRP thanks to the above-mentioned configuration.

More specifically, the above-mentioned configuration provides a function of removing carbon fibers at a peripheral part (O) of the drill, and makes the rake angle gentle except at the peripheral part (O) of the drill. As a result, the cutting force of the drill (11) is significantly improved, thereby solving problems such as fluffing of carbon fibers around a drilled hole of a workpiece, and delamination when drilling a workpiece such as CFRP, etc.

Hence, the drill (41) according to the fifth embodiment which is a double margin type and comprises the thinning cutting blade (3), the main cutting blade (4), and the U-shaped cutting blade (5) can significantly reduce drilling resistance, and can easily drill holes by manpower using a hand drill, a manual drill press or the like when drilling not only steel-based materials such as stainless but also a thin plate, soft materials, and a carbon fiber reinforced plastic (CFRP).

Moreover, the reduction of drilling resistance improves drilling accuracy and reduces the time to drill holes, resulting in an improvement of working efficiency. It also allows for significant increase in the drill's life span.

Sixth Embodiment

Figure 11:
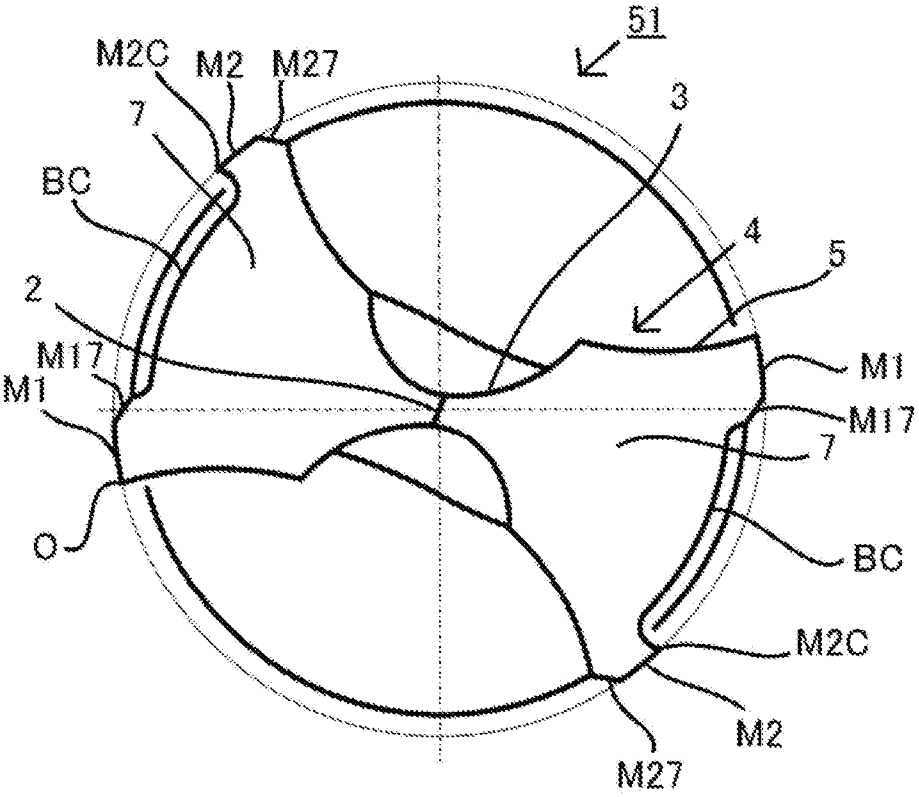
FIG. 11 It is a top view (seen from a tip side of a drill) of a drill according to sixth embodiment.
Figure 12:
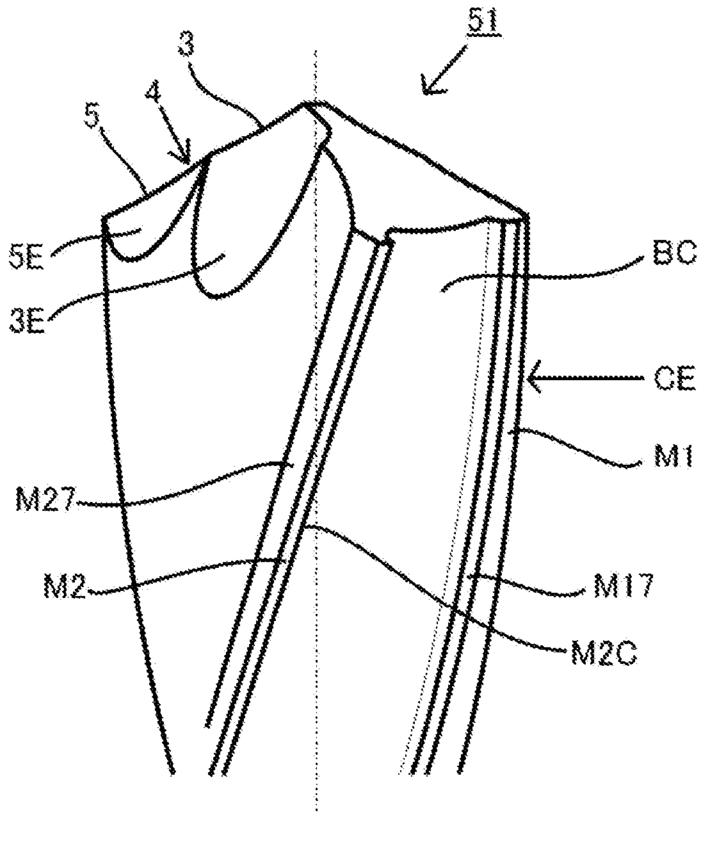
FIG. 12 It is a front view (side view) of a drill according to the sixth embodiment.

FIG. 11 is a top view (seen from a tip side of a drill) and FIG. 12 is a front view (side view) of a drill according to the sixth embodiment.

In FIGS. 11 and 12, same components as shown in the drill of FIGS. 7 and 8 are given the same numerals.

For a drill (51) according to the sixth embodiment as well as the third embodiment, an U-shaped cutting blade (5) is formed to be adjacent to a thinning cutting blade (3) and aligned at the outer peripheral side in a radial direction. That is the U-shaped cutting blade (5) is provided throughout a main cutting blade (4).

For the drill (51) according to the sixth embodiment, the peripheral part of the drill is a double margin type (i.e. there are a first margin part (M1) and a second margin part (M2)) substantially having four blades, i.e. a cutting blade (second margin cutting blade (M2C)) is also provided for the second margin part (M2) at the heel side, thereby more easily preventing delamination during drilling a workpiece such as CFRP.

As shown in FIGS. 11-12, the first margin part (M1) and the second margin part (M2) preferably have a first margin clearance part (M1) and a second margin clearance part (M2) respectively so as to avoid unnecessary friction with a workpiece.

For the drill (51) according to the sixth embodiment, a part drilled by a peripheral cutting blade (CE) is subsequently drilled by the second margin cutting blade (M2C), thereby enabling to cut away a part which is unable to be cut due to a little elastic deformation during drilling, and solve problems such as delamination during drilling a workpiece such as CFRP, etc.

The drill (51) according to the sixth embodiment has the same configuration as that of the drill (21) according to the third embodiment except for the above-mentioned components.

Hence, the drill (51) according to the sixth embodiment which is a double margin type and comprises the thinning cutting blade (3) and the U-shaped cutting blade (5) provided throughout the main cutting blade (4) can significantly reduce drilling resistance and can easily drill holes by manpower using a hand drill, a manual drill press or the like when drilling not only steel-based materials such as stainless but also a thin plate, soft materials, and a carbon fiber reinforced plastic (CFRP).

Moreover, the reduction of drilling resistance improves drilling accuracy and reduces the time to drill holes, resulting in an to improvement of working efficiency. It also allows for significant increase in the drill's life span.

Seventh Embodiment

Figure 13:
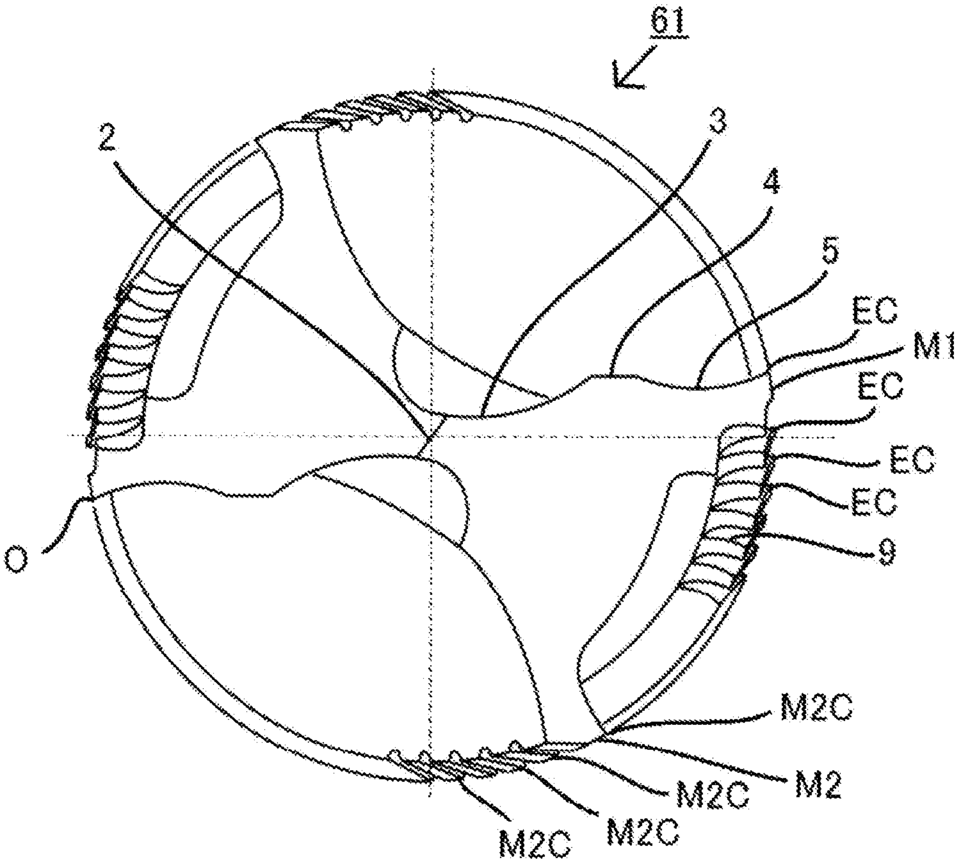
FIG. 13 It is a top view (seen from a tip side of a drill) of a drill according to seventh embodiment.
Figure 14:
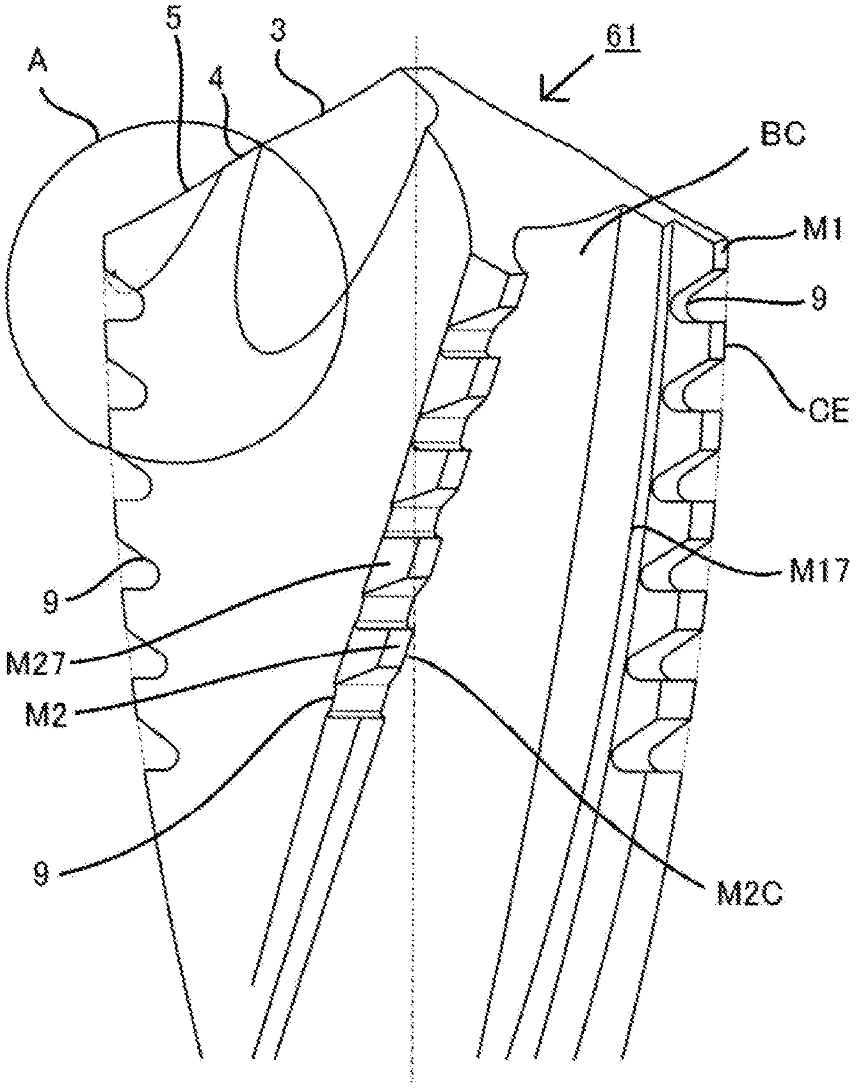
FIG. 14 It is a front view (side view) of a drill according to the seventh embodiment.
Figure 15:
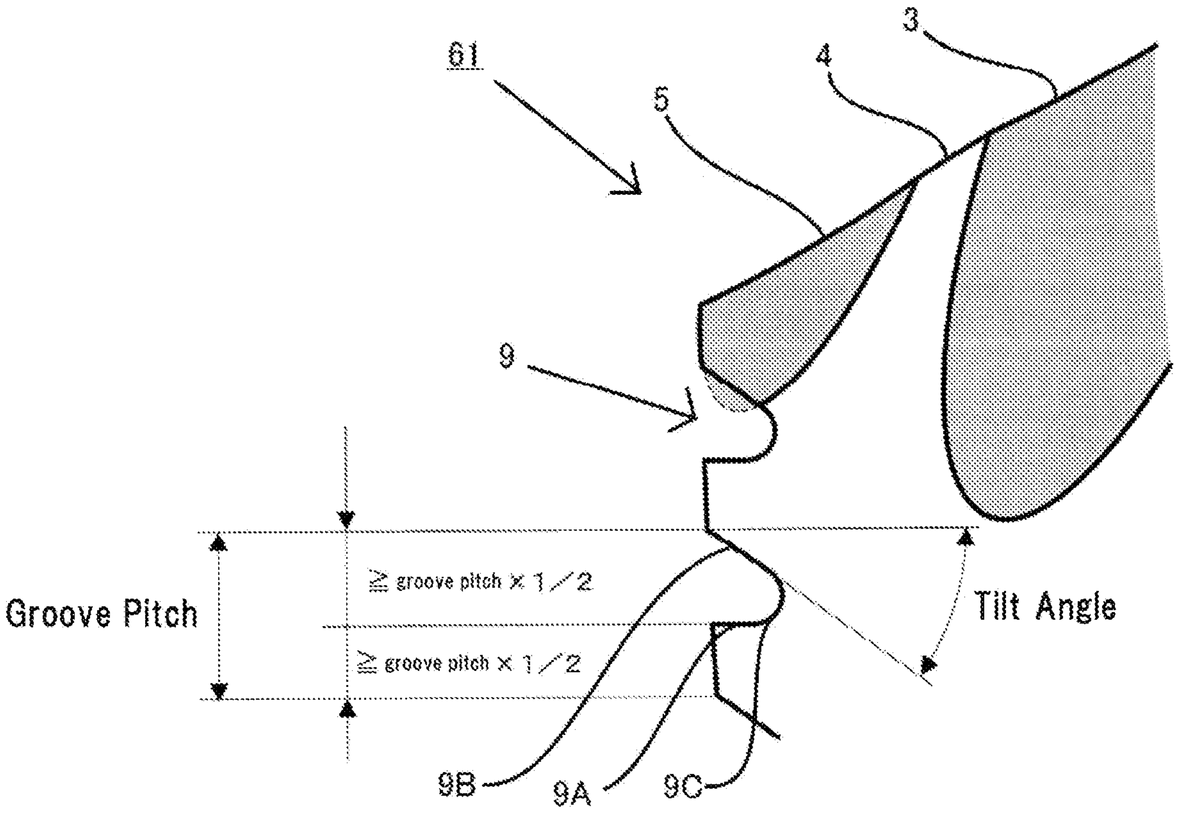
FIG. 15 It is an enlarged top view of a main part (seen from a tip side of a drill) of a drill according to the second embodiment.

FIG. 13 is a top view (seen from a tip side of a drill), FIG. 14 is a front view (side view), and FIG. 15 is an enlarged top view of a main part of a drill according to the seventh embodiment.

In FIGS. 13 to 15, same components as shown in the drill of FIGS. 7 and 8 are given the same numerals.

For a drill (61) according to the seventh embodiment as well as the fifth embodiment, an U-shaped cutting blade (5) is provided in contact with a peripheral part (O) of the drill.

For the drill (61) according to the seventh embodiment, the peripheral part of the drill is a double margin type (i.e. there are a first margin part (M1) and a second margin part (M2)) substantially having four blades, i.e. a cutting blade (second margin cutting blade (M2C)) is also provided for the second margin part (M2) at the heel side, thereby more easily preventing delamination during drilling a workpiece such as CFRP.

As shown in FIGS. 13 and 14, the first margin part (M1) and the second margin part (M2) preferably have a first margin clearance part (M17) and a second margin clearance part (M27) respectively to avoid unnecessary friction with a workpiece.

The drill (61) according to the seventh embodiment is provided with grooves (peripheral grooves (9)) at the peripheral part near the drill tip, in order to suppress heat generation during drilling especially CFRP.

Preferably, both or either of a peripheral cutting blade (CE) and the second margin cutting blade (M2C) are provided with the peripheral grooves (9), and each of the peripheral grooves (9) is placed such that the grooves of the peripheral cutting blade (CE) and the ones of the second margin cutting blade (M2C) are alternately aligned along the longitudinal direction.

As a result of providing peripheral grooves (9) on both or either of the peripheral cutting blade (CE) and the second margin cutting blade (M2C), it is possible to suppress heat generation during drilling a workpiece, and solve problems such as deformation of a drilled hole and a change of material quality of a workpiece such as CFRP due to heat generation during drilling.

As mentioned above, the drill (61) according to the seventh embodiment is provided with the peripheral grooves (9) to suppress heat generation during drilling, such that the drill (61) is not heated too high to touch directly by hands after it is used for drilling a workpiece.

Especially, the peripheral grooves (9) are more effective when they are provided for both the peripheral cutting blade (CE) and the second margin cutting blade (M2C). As a result, it enables a long life span and suppression of delamination.

It means most of drilling is performed by the part with peripheral grooves (9), and then finished in succession by the part without peripheral grooves (CE) and the second margin cutting blade (M2C). Thanks to the heat generation suppressing effect by the peripheral grooves (9) and the finishing effect by the sharp cutting blade of the peripheral cutting blade (CE) and the second margin cutting blade (M2C) without peripheral grooves (9), it is possible to ensure a long life span and prevent delamination.

It is efficient to determine where to provide the peripheral grooves (9) within the range from an equal length to ½ of the drill diameter relative to the peripheral part (O) of the drill tip. Each of the peripheral grooves (9) preferably have a horizontal side (9A) in contact with a workpiece and an opposite side (9B) in a tilted shape (see FIG. 15).

Appropriate example of the tilt is between 30 and 40 degrees relative to the horizontal line where a longitudinal direction is regarded as a perpendicular line.

The tilt is provided to prevent breakage since the peripheral cutting blade (CE) lacks intensity because of the peripheral grooves (9), and the tilt can be horizontal.

It is possible to provide a corner of the groove's bottom (9C) with an appropriate arc (R) to prevent breakage of the drill.

The depth of the peripheral grooves (9) are set to approximately 5% to 10% of the drill diameter and adjusted according to the drill diameter (for example, adjusted to a smaller size when a drill diameter is relatively large, and adjusted to a larger size when a drill diameter is small).

When the peripheral grooves (9) are set to a range from an equal length to ½ of the drill diameter but the drilling depth is deep, it is possible to suppress heat generation by setting the length larger than the drill diameter.

The area including from the tip to the peripheral cutting blade of the drill (61) according to the seventh embodiment can be coated with diamond in order to improve drilling efficiency on CFRP and life span of a drilled hole. As a result, a quality of a drilled hole (delamination prevention) and life span of a drilled hole are significantly improved.

Figure 16:
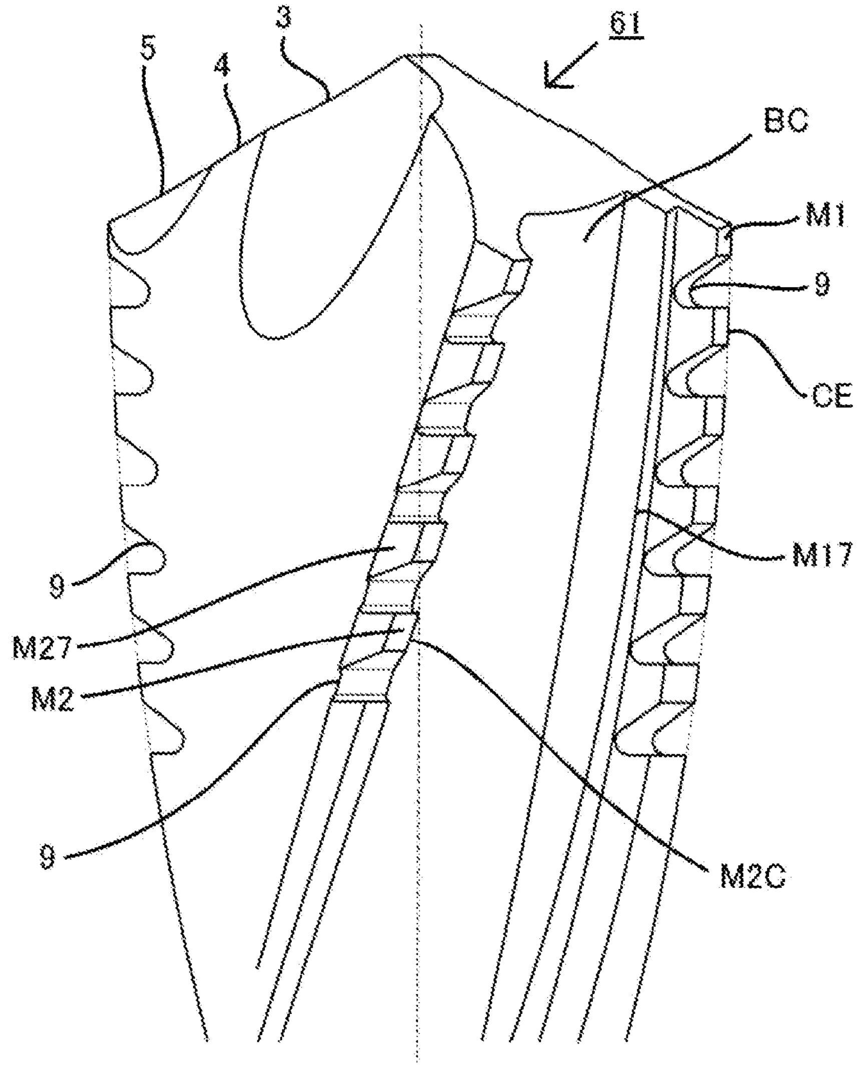
FIG. 16 It is a front view (side view) of a drill according to other examples of the seventh embodiment.

As shown in FIGS. 13-15, the peripheral grooves (9) are formed so that a part of the U-shaped cutting blade (5) is missing. For example, the longitudinal length of the drill (61) with the U-shaped cutting blade (5) can be shortened so that the U-shaped cutting blade (5) is not chipped by the peripheral grooves (9) as shown in FIG. 16.

Further, in the embodiment, the shape of the U-shaped cutting blade (5) is not particularly limited, and any shape of the U-shaped cutting blade (5) provided for the drills of first to sixth embodiments is possible.

The drill (61) according to the seventh embodiment has the same configuration as that of the drill (41) according to the fifth embodiment except for the above-mentioned components.

As described above, the drill according to the seventh embodiment, which is a double margin type comprising the thinning cutting blade (3), the main cutting blade (4), and the U-shaped cutting blade (5), and having peripheral grooves (9) on both or either of the peripheral cutting blade (CE) and the second margin cutting blade (M2C), can significantly reduce drilling resistance and can easily drill holes by a hand drill, a manual drill press, machining centers for machining or the like, when drilling a carbon fiber reinforced plastic (CFRP).

Moreover, reduction of drilling resistance improves drilling accuracy and reduces the time to drill holes, resulting in an improvement of working efficiency. It also allows for significant increase in the drill's life span.

EXAMPLES

The effect of the present invention will be clearer by showing test results on the drill of the present invention in the examples and the drill of comparative examples. However, the present invention is not limited to the following examples in any way.

<Test 1: Drilling Test on Acrylic Plates>

A drilling test was performed on acrylic plates using examples 1-6 and a comparative example 1.

Acrylic plates of 5 mm×100 mm×100 mm were used for a workpiece.

Following drills were used for examples 1-6 and the comparative example 1.

Example 1: a drill according to the first embodiment, drill diameter of 8 mm, material quality equal to SKH55.

Example 2: a drill according to the second embodiment, drill diameter of 8 mm, material quality equal to SKH55.

Example 3: a drill according to the third embodiment, drill diameter of 8 mm, material quality equal to SKH55.

Figure 17:
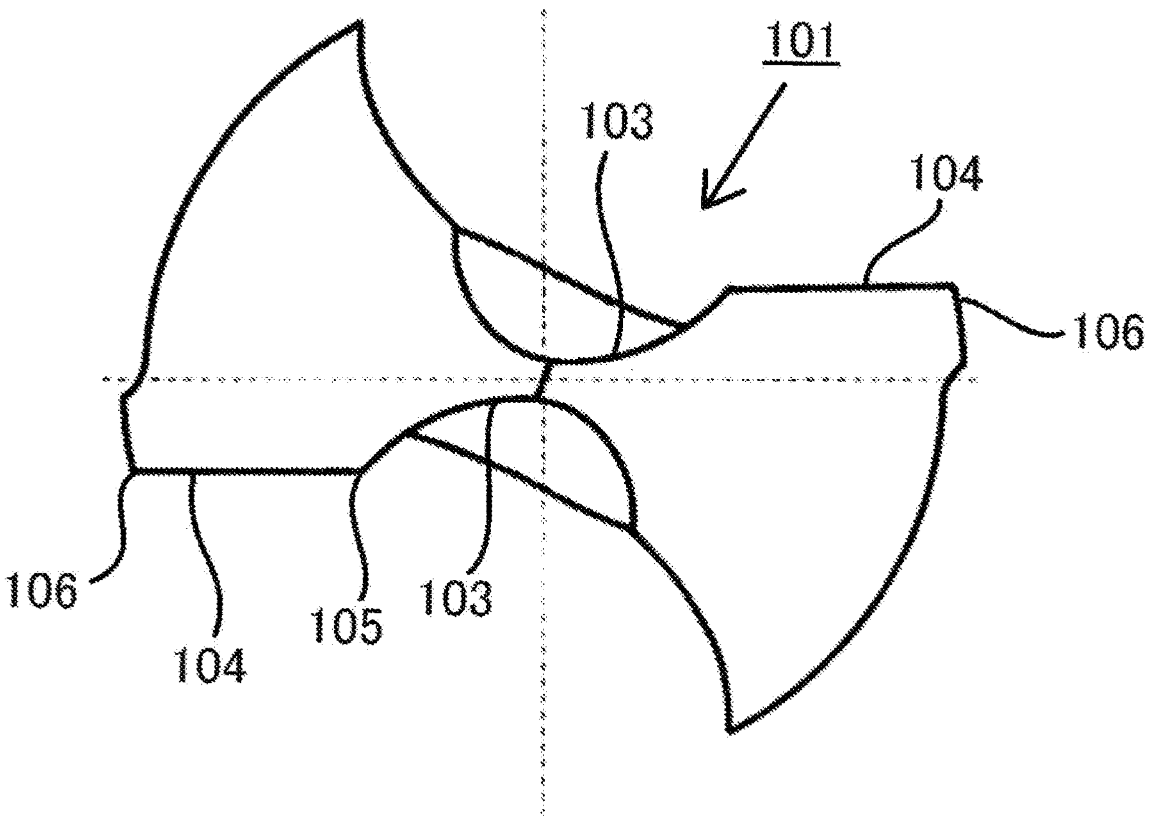
FIG. 17 It is a front view (side view) of a conventional drill.

Example 4: a drill according to the forth embodiment, drill diameter of 8 mm, material quality equal to SKH55.
Example 5: a drill according to the fifth embodiment, drill diameter of 8 mm, material quality equal to SKH55.
Example 6: a drill according to the sixth embodiment, drill diameter of 8 mm, material quality equal to SKH55.
Comparative example 1: a conventional drill in FIG. 17, drill diameter of 8 mm, material quality equal to SKH55.

It was confirmed whether acrylic plates would be damaged by the time the acrylic plates would be penetrated by using drills of examples 1-6 and the comparative example 1. The test was repeated three times per each drill.

Using an ATM-12 type air drill manufactured by KTS and 1,200 RPM rotations in unloading state, an operator perpendicularly drilled/bored acrylic plates vertically fixed by a vise.

The results of the drilling and boring tests are shown in Tables 1 and 2.

TABLE 1

Drilling test

|  | Example 1 | Example 2 | Example 3 | Example 4 | Example 5 | Example 6 | Comparative Example 1 |
|---|---|---|---|---|---|---|---|
| First | ○ | ○ | ○ | ○ | ○ | ○ | X |
| Second | ○ | ○ | ○ | ○ | ○ | ○ | X |
| Third | ○ | ○ | ○ | ○ | ○ | ○ | X |

○: drilled without cracks
X: damaged with cracks appeared around holes

TABLE 2

Surface roughness by visual observation

|  | Example 1 | Example 2 | Example 3 | Example 4 | Example 5 | Example 6 | Comparative Example 1 |
|---|---|---|---|---|---|---|---|
| First | ○ | ◎ | ◎ | ○ | ◎ | ◎ | — |
| Second | ○ | ◎ | ◎ | ○ | ◎ | ◎ | — |
| Third | ○ | ◎ | ◎ | ○ | ◎ | ◎ | — |

○: good
◎: better than ○
—: damaged

As described above, the drills in examples 1-6 of the present invention can drill acrylic plates without breaking the plates.

The drill of the comparative example 1 could not drill acrylic plates, because cracks appeared around the drilled holes and the acrylic plates were damaged.

As shown in Table 2, the drills in examples 1-6 of the present invention allowed for good surface roughness of the drilled holes. In particular, it was found out that more stable drilling is possible and surface roughness of drilled holes can be improved when providing an U-shaped cutting blade in contact with a peripheral cutting blade (examples 2, 3, 5, and 6).

On the other hand, the drill of the comparative example 1 could not drill acrylic plates, because cracks appeared around the drilled holes and the acrylic plates were damaged.

<Test 2: Drilling Test on CFRP of Aircraft Glade>

Using example 7 and a comparative example 2, a drilling test was performed on CFRP of aircraft glade (thickness of 10 mm).

CFRP of aircraft glade (measured thickness of 10.5 mm) was used for a workpiece.

The following drills were used for example 7 and the comparative example 2 respectively.

Example 7: a drill according to the seventh embodiment, hard metal+diamond coating, drill diameter of 8.0 mm.
Comparative example 2: a coating R drill manufactured by MAKOTOLOY Co., Ltd., hard metal+diamond coating, drill diameter of 5.6 mm.

CFRP was drilled by the drill in example 7 and the comparative example 2. The test was repeated three times per each drill.

Using NC milling machine manufactured by OHTORI KIKO CO., LTD and under the condition of 6,000 RPM and a feed rate of 0.03 mm/rev., CFRP was drilled and bored.

When using the drill of example 7 of the present invention, no delamination occurred after drilling 3,000 holes in FRP (thickness of about 10 mm) (by visual observation).

When using the drill of example 2, the drill's outer peripheral cutting blade was severely worn down after drilling 1,000 holes, and drilling was stopped even though no delamination was visually observed.

Theses results demonstrate that the drill in example 7 of the present invention can stably drill CFRP of aircraft glade without any delamination.

In general, a drill with larger diameter is likely to cause delamination. However, no delamination occurred in the test even if using a drill with bigger diameter than that of the comparative example.

The present invention is suitably used as the drill employed in a hole drilling operation using a hand drill, a drill press or the like, and suitably applied to a carbon fiber reinforced plastic (CFRP) used for aircrafts, etc.

EXPLANATIONS OF NUMERALS

1 Drill
2 Chisel
2E Chisel edge

2W Chisel width
3 Thinning cutting blade
3E End part of a thinning cutting blade
3S Thinning face
4 Main cutting blade
5 U-shaped cutting blade
5E End part of an U-shaped cutting blade
5S Face of an U-shaped cutting blade
6 Drill diameter
7 Clearance face
8 Chip discharge port
9 Peripheral groove
CE Peripheral cutting blade
M1 First margin part
M2 Second margin part
O Peripheral part of a drill
RP Remaining part from an U-shaped cutting blade

The invention claimed is:

1. A drill comprising:

two cutting blades which are formed symmetrical about an axis of rotation, wherein each of the cutting blades has a main cutting blade (4) formed from a drill tip toward a peripheral side of the drill to become a shape with curves;

a thinning cutting blade (3) in closer to the drill tip than the main cutting blade to become a shape with curves; and an U-shaped cutting blade (5) formed in closer to the peripheral side of the drill than the thinning cutting blade to become a shape with curves;

wherein said U-shaped cutting blade (5) is separated from said thinning cutting blade (3) such that said main cutting blade (4) is located between said thinning cutting blade (3) and said U-shaped cutting blade (5);

wherein the U-shaped cutting blade is formed near the peripheral side of the drill, wherein said drill has two clearance faces formed symmetrical to the axis of rotation, wherein the clearance faces are provided with back grooves in a shape with curves so as to comprise a first margin part and a second margin part located at a heel side of the first margin part;

wherein said U-shaped cutting blade is connected to a peripheral cutting blade;

wherein multiple peripheral grooves are formed at the peripheral cutting blade and/or a peripheral part of the second margin part;

wherein the grooves have a length equivalent to the drill diameter to ½ of the drill diameter or more than the drill diameter;

wherein each of the grooves has horizontal side and an opposite side in titled shape, wherein a tilting angle of the titled shape of each of the grooves is between 30 and 40 degrees relative to a horizontal line;

wherein each of grooves has a bottom (9C) which is arced (R); and wherein a depth of the grooves is approximately 5% to 10% of the drilled diameter.

2. The drill according to claim 1, wherein a second margin cutting blade is provided at the second margin part.

3. The drill according to claim 2, wherein the multiple peripheral grooves are formed at the peripheral cutting blade and/or a peripheral part of the second margin cutting blade.

* * * * *